(12) United States Patent
Mola et al.

(10) Patent No.: US 10,481,998 B2
(45) Date of Patent: Nov. 19, 2019

(54) PROTECTING SENSITIVE INFORMATION IN TIME TRAVEL TRACE DEBUGGING

(71) Applicant: Microsoft Technology Licensing, LLC, Redmond, WA (US)

(72) Inventors: Jordi Mola, Bellevue, WA (US); Henry Gabryjelski, Sammamish, WA (US); Jackson Michael Davis, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/921,883

(22) Filed: Mar. 15, 2018

(65) Prior Publication Data

US 2019/0286549 A1    Sep. 19, 2019

(51) Int. Cl.
G06F 11/36    (2006.01)
G06F 11/34    (2006.01)
G06F 21/62    (2013.01)

(52) U.S. Cl.
CPC ...... *G06F 11/3636* (2013.01); *G06F 11/3476* (2013.01); *G06F 11/366* (2013.01); *G06F 21/6254* (2013.01)

(58) Field of Classification Search
None
See application file for complete search history.

(56) References Cited

U.S. PATENT DOCUMENTS

| 7,158,979 | B2  | 1/2007  | Iverson et al. |
| 7,213,113 | B2* | 5/2007  | Sahin ................. G06F 11/3466 711/162 |
| 7,444,677 | B2  | 10/2008 | Marr |

(Continued)

FOREIGN PATENT DOCUMENTS

| GB | 2459652 A    | 11/2009 |
| WO | 2010028395 A1 | 3/2010 |

OTHER PUBLICATIONS

Chen, "Control Flow Obfuscation with Information Flow Tracking", 2009, ACM (Year: 2009).*

(Continued)

*Primary Examiner* — Hossain M Morshed
(74) *Attorney, Agent, or Firm* — Workman Nydegger

(57) ABSTRACT

Protecting sensitive information in connection with tracing an original execution of an entity. Embodiments include identifying that original information—which was accessed based on an original execution of one or more original executable instructions of the entity—comprises sensitive information. Based on the original information comprising the sensitive information, embodiments include performing one or both of (i) storing first trace data comprising alternative information—rather than the original information— into the trace, while ensuring that an execution path that was taken by the entity based on the original information is also taken during replay of the original execution of the entity using the trace; or (ii) storing second trace data into the trace that causes zero or more alternative executable instructions—rather than the one or more original executable instructions of the entity—to be executed during the replay of the original execution of the entity.

17 Claims, 7 Drawing Sheets

(56) References Cited

U.S. PATENT DOCUMENTS

| | | | |
|---|---|---|---|
| 7,644,440 B2* | 1/2010 | Sinha | G06F 21/52 713/176 |
| 8,522,047 B2* | 8/2013 | Eker | G06F 21/14 713/190 |
| 8,930,327 B2 | 1/2015 | Hossain et al. | |
| 9,021,262 B2 | 4/2015 | Krajec | |
| 9,207,969 B2* | 12/2015 | Krajec | G06F 9/4806 |
| 9,501,654 B1 | 11/2016 | Adir et al. | |
| 9,600,664 B1* | 3/2017 | Roth | G06F 21/55 |
| 9,716,704 B2 | 7/2017 | Milman et al. | |
| 10,042,737 B2* | 8/2018 | Mola | G06F 11/3636 |
| 2003/0105958 A1 | 6/2003 | McArdle | |
| 2003/0188231 A1* | 10/2003 | Cronce | G06F 21/51 714/52 |
| 2004/0139305 A1 | 7/2004 | Arimilli et al. | |
| 2004/0165728 A1* | 8/2004 | Crane | G06F 21/62 380/279 |
| 2005/0039031 A1* | 2/2005 | Mont | H04L 63/0435 713/189 |
| 2007/0234430 A1* | 10/2007 | Goldsmid | G06F 21/125 726/26 |
| 2008/0275829 A1* | 11/2008 | Stull | H04L 9/00 706/17 |
| 2009/0132419 A1 | 5/2009 | Grammer et al. | |
| 2010/0293618 A1 | 11/2010 | Medvedev et al. | |
| 2013/0160128 A1* | 6/2013 | Dolan-Gavitt | G06F 11/3414 726/25 |
| 2013/0185803 A1 | 7/2013 | Travis et al. | |
| 2014/0019756 A1* | 1/2014 | Krajec | H04L 63/0428 713/167 |
| 2015/0052059 A1 | 2/2015 | Everhart | |
| 2015/0067654 A1* | 3/2015 | Seto | G06F 11/3636 717/128 |
| 2015/0113240 A1 | 4/2015 | Abrams et al. | |
| 2015/0161397 A1 | 6/2015 | Cook et al. | |
| 2015/0248564 A1 | 9/2015 | Feng et al. | |
| 2019/0149320 A1* | 5/2019 | Keselman | H04L 9/083 |

OTHER PUBLICATIONS

Taneja, et al., "Testing Software in Age of Data Privacy: A Balancing Act", In Proceedings of 19th ACM SIGSOFT Symposium on Foundations of Software Engineering, Sep. 5, 2011, pp. 201-211.

Hoverd, et al., "Environment Orientation: A Structured Simulation Approach for Agent-Based Complex Systems", In Journal of Natural Computing, vol. 14, Issue 1, Mar., 2015, pp. 83-97.

"International Search Report and Written Opinion Issued in PCT Application No. PCT/US19/021249", dated Aug. 1, 2019, 17 pages.

* cited by examiner

PROTECTING SENSITIVE INFORMATION IN TIME TRAVEL TRACE DEBUGGING

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace data streams. These trace data stream(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

Because time travel debuggers record a bit-accurate trace of execution of a program—including both the code that executed and memory values that were read during that program's execution—they have the potential to capture and reveal sensitive code and/or data that, in many cases, should not be made available to those who have access to the resulting trace data (e.g., developers utilizing a debugger that consumes the trace data stream(s)). This may due to security context (e.g., kernel vs. user mode), variations in code authorship (e.g., code developed by one author vs. a called library developed by another author), organizational divisions, policy/legal concerns, etc. For example, time travel debuggers could capture the cryptographic information such as values of encryption keys, random numbers, salts, hashes, nonces, etc.; personally-identifiable information (PII) such as names, mailing addresses, birthdays, social security numbers, e-mail addresses, IP addresses, MAC addresses, etc.; financial information such as credit card numbers, account numbers, financial institutions; authentication information such as usernames, passwords, biometric data, etc.; general inputs such as search terms, file names, etc.; code that may be desired to be kept private; and so on. The ability of time travel debuggers to reveal sensitive information is becoming of increased concern, since time travel debugging technology is advancing to the point that it can have low enough recording overheads to enable it to be employed in production systems—and potentially even in "always on" configurations.

BRIEF SUMMARY

At least some embodiments described herein identify sensitive information in connection with a time-travel trace (during trace recording and/or at some later time) and remove and/or mask that sensitive information in the trace. For example, embodiments may include storing alterative data in a trace (rather than original data identified as sensitive), replacing original instructions in the trace with alternative instructions that avoid executing sensitive code or that cause correct execution in view of a data replacement, overriding the execution behavior of one or more instructions, and the like. As such, embodiments enable time travel traces to be generated and consumed—even in production environments—while preserving sensitive information from being revealed.

Embodiments can include methods, systems, and computer program products for protecting sensitive information in connection with tracing an original execution of an entity. These embodiments can include, for example, identifying that original information—which was accessed based on an original execution of one or more original executable instructions of the entity—comprises sensitive information. Based on the original information comprising the sensitive information, these embodiments can include performing one or both of (i) storing first trace data comprising alternative information—rather than the original information—into a first trace data stream, while ensuring that an execution path that was taken by the entity based on the original information will also be taken during replay of the original execution of the entity using the first trace data stream; or (ii) storing second trace data into a second trace data stream that causes one or more alternative executable instructions—rather than the one or more original executable instructions of the entity—to be executed during the replay of the original execution of the entity using the second trace data stream.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
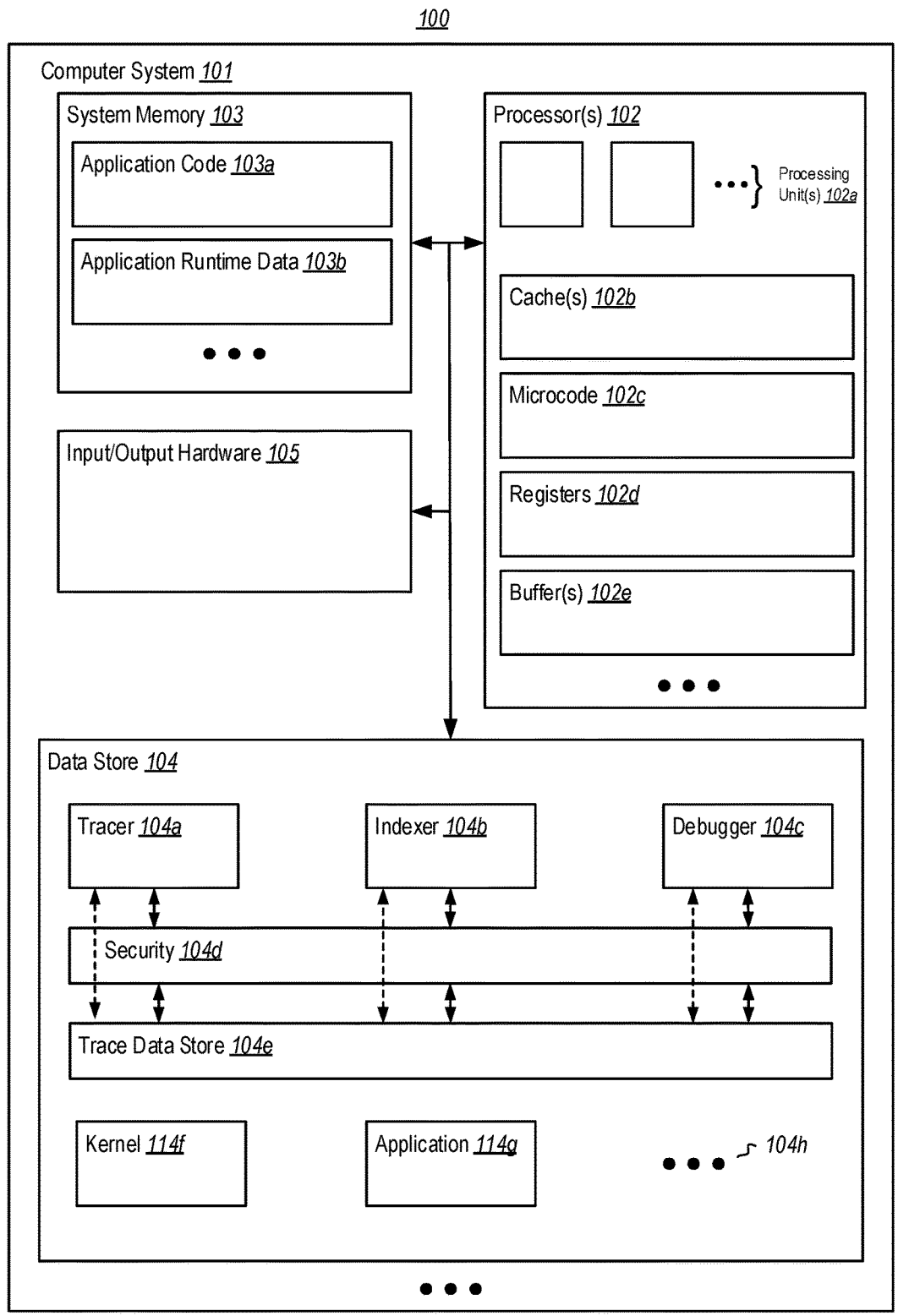
FIG. 1 illustrates an example computer architecture that facilitates protecting sensitive information in connection with tracing an original execution of an entity.

At least some embodiments described herein identify sensitive information in connection with a time-travel trace (during trace recording and/or at some later time) and remove and/or mask that sensitive information in the trace. For example, embodiments may include storing alterative data in a trace (rather than original data identified as sensitive), replacing original instructions in the trace with alternative instructions that avoid executing sensitive code or that cause correct execution in view of a data replacement, overriding the execution behavior of one or more instructions, and the like. As such, embodiments enable time travel traces to be generated and consumed—even in production environments—while preserving sensitive information from being revealed.

As used in this specification, and in the claims, the phrases "sensitive information," "sensitive data," "sensitive code," and the like, refer to data and/or code that is consumed at one or more processing unit(s) during tracing of those processing unit(s) into one or more trace data stream(s), and that should be (or potentially should be) restricted and/or prevented from being made available to a consumer of those trace data stream(s). As mentioned in the Background, sensitive data could correspond, for example, to cryptographic information such as values of encryption keys, random numbers, salts, hashes, nonces, etc.; personally-identifiable information (PII) such as names, mailing addresses, birthdays, social security numbers, e-mail addresses, IP addresses, MAC addresses, etc.; financial information such as credit card numbers, account numbers, financial institutions; authentication information such as usernames, passwords, biometric data, etc.; general inputs such as search terms, file names, etc.; and so on. Sensitive code could correspond to code executing cryptographic routines, code implementing proprietary algorithms, etc. The classifications of data or code as being sensitive could be based on security context (e.g., kernel vs. user mode), variations in code authorship (e.g., code developed by one author vs. a called library developed by another author), organizational divisions, policy and/or legal concerns, etc.

As used herein, the phrases "non-sensitive information," "non-sensitive data," "non-sensitive code," and the like, refer to information that is likely not sensitive. This could include, for example, information for which a confidence that the information is non-sensitive is substantially 0%, or is below a predetermined threshold (e.g., such as 10%). Conversely, "sensitive information," "sensitive data," "sensitive code," and the like, encompass information that is definitively sensitive, information that is likely sensitive, and information that is potentially sensitive. As such, unless otherwise specified, use of the phrases "sensitive information," "sensitive data," "sensitive code" (and the like) should be interpreted broadly to encompass definitively sensitive information, likely sensitive information, and potentially sensitive information. In some embodiments, definitively sensitive information could include information for which a confidence that the information is sensitive is substantially 100%, or is above a predetermined threshold (e.g., such as 95%). In some embodiments, likely sensitive information could include information for which a confidence that the information is sensitive exceeds a predetermined threshold (e.g., such as >50% or >=75%). In some embodiments, potentially sensitive information could include information for which a confidence that the information is sensitive is between the thresholds for non-sensitive information and likely sensitive information.

FIG. 1 illustrates an example computing environment 100 that facilitates protecting sensitive information in connection with tracing an original execution of an entity. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

FIG. 1 includes a simplified representation of the internal hardware components of the processor(s) 102. As illustrated, each processor 102 includes a plurality of processing unit(s) 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, operating kernel 104f, application 104g, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102a obtains processor instructions from one or more processor cache(s) 102b and executes the processor instructions based on data in the cache(s) 102b, based on data in registers 102d, and/or without input data. In general, each cache 102b is a small amount (i.e., small relative to the typical amount of system memory 103) of random-access memory that stores on-processor copies of portions of a backing store, such as the system memory 103 and/or another cache in the cache(s) 102b. For example, when executing the application code 103a, one or more of the cache(s) 102b contain portions of the application runtime data 103b. If the processing unit(s) 102a request data not already stored in a particular cache 102b, then a "cache miss" occurs, and that data is fetched from the system memory 103 or another cache, potentially "evicting" some other data from that cache 102b. The cache(s) 102b may include code cache portions and data cache portions. When executing the application code 103a, the code portion(s) of the cache(s) 102b may store at least a portion of the processor instructions stored in the application code 103a and the data portion(s) of the cache(s) 102b may store at least a portion of data structures of the application runtime data 103b.

Each processor 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 is typically embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the cache(s) 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiments, processors 102 may also include control registers, which are used to control different aspects of processor operation. Although FIG. 1 depicts registers 102d as a single box, it will be appreciated that each processing unit 102a typically includes one or more corresponding sets of registers 102d that are specific to that processing unit.

The data store 104 can store computer-executable instructions representing application programs such as, for example, a tracer 104a, an indexer 104b, a debugger 104c, a security component 104d, an operating system kernel 104f, an application 104g (e.g., the application that is the subject of tracing by the tracer 104a). When these programs are executing (e.g., using the processor(s) 102), the system memory 103 can store corresponding runtime data, such as runtime data structures, computer-executable instructions, etc. Thus, FIG. 1 illustrates the system memory 103 as including time application code 103a and application runtime data 103b (e.g., each corresponding with application 104g). The data store 104 can further store data structures, such as trace data stored within one or more trace data stores 104e. As indicated by the ellipses 104h, the data store 104 could also store other computer-executable instructions and/or data structures.

The tracer 104a is usable to record a bit-accurate trace of execution of one or more entities, such as one or more threads of an application 104g or kernel 104f, and to store the trace data into the trace data store 104e. In some embodiments, the tracer 104a is a standalone application, while in other embodiments the tracer 104a is integrated into another software component, such as the kernel 104f, a hypervisor, a cloud fabric, etc. While the trace data store 104e is depicted as being part of the data store 104, the trace data store 104e may also be embodied, as least in part, in the system memory 103, in the cache(s) 102b, or at some other storage device.

In some embodiments, the tracer 104a records a bit-accurate trace of execution of one or more entities. As used herein, a "bit accurate" trace is a trace that includes sufficient data to enable code that was previously executed at one or more processing units 102a to be replayed, such that it executes in substantially the same manner at replay time as it did during tracing. There are a variety of approaches the tracer 104a might use to record bit-accurate traces. Two different families of approaches that provide high levels of performance and reasonable trace size are now briefly summarized, though it will be appreciated that the embodiments herein can operate in connection with traces recorded using other approaches. Additionally, optimizations could be applied to either of these families of approaches that, for brevity, are not described herein.

A first family of approaches is built upon the recognition that processor instructions (including virtual machine "virtual processor" instructions) generally fall into one of three categories: (1) instructions identified as "non-deterministic" as not producing predictable outputs because their outputs are not fully determined by data in general registers 102d or the cache(s) 102b, (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

In some embodiments, the first approach(es) for recording traces records non-deterministic instructions that produce output not fully determined by their inputs by storing into the trace data store 104e the side-effects of execution of such instructions. As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked by the tracer 104a (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into the trace data store 104e.

Addressing how to reproduce the values of input registers for deterministic instructions (e.g., whose inputs depend only on processor register values) is straightforward, as they are the outputs of the execution of the prior instruction(s). Thus, the first approach(es) for recording traces can therefore reduce recording the execution of an entire series of processor instructions into the trace data store 104e to reproducing the register values at the beginning of the series; the trace data in the trace data store 104e need not store a record of which particular instructions executed in the series, or the intermediary register values. This is because the actual instructions are available from the application code 103a, itself. These instructions can therefore be supplied the recorded inputs (i.e., the recorded initial set of register values) during reply, to execute in the same manner as they did during the trace.

Finally, the first approach(es) for recording traces can address how to reproduce the values of input memory for deterministic instructions whose inputs depend on memory values by recording into the trace data store 104e the memory values that these instructions consumed (i.e., the reads)—irrespective of how the values that the instructions read were written to memory. In other words, some embodiments include recording only memory reads, but not memory writes. For example, although values may be written to memory by a current thread, by another thread (including the kernel, e.g., as part of processing an interrupt), or by a hardware device (e.g., input/output hardware 105), it is just the values that the thread's instructions read that are needed for full replay of instructions of the thread that perform reads. This is because it is that values that were read by the thread (and not necessarily all the values that were written to memory) that dictated how the thread executed.

A second family of approaches for recording bit-accurate traces is built on the recognition that the processor 102 (including the cache(s) 102b) form a semi- or quasi-closed system. For example, once portions of data for a process (i.e., code data and runtime application data) are loaded into the cache(s) 102b, the processor 102 can run by itself—without any input—as a semi- or quasi-closed system for bursts of time. In particular, once the cache(s) 102b are loaded with data, one or more of the processing units 102a execute instructions from the code portion(s) of the cache(s) 102b, using runtime data stored in the data portion(s) of the cache(s) 102b and using the registers 102d. When a processing unit 102a needs some influx of information (e.g., because an instruction it is executing, will execute, or may execute accesses code or runtime data not already in the cache(s) 102b), a "cache miss" occurs and that information is brought into the cache(s) 102b from the system memory 103. For example, if a data cache miss occurs when an executed instruction performs a memory operation at a memory address within the application runtime data 103b, data from that memory address is brought into one of the cache lines of the data portion of the cache(s) 102b. Similarly, if a code cache miss occurs when an instruction performs a memory operation at a memory address application code 103a stored in system memory 103, code from that memory address is brought into one of the cache lines of the code portion(s) of the cache(s) 102b. The processing unit 102a then continues execution using the new information in the cache(s) 102b until new information is again brought into the cache(s) 102b (e.g., due to another cache miss or an un-cached read).

Thus, in the second family of approaches, the tracer 104a can record sufficient data to be able to reproduce the influx of information into the cache(s) 102b as a traced processing unit executes. Four example implementations within this second family of approaches are now described, though it will be appreciated that these are not exhaustive.

A first implementation could record into the trace data store 104e all of the data brought into the cache(s) 102b by logging all cache misses and un-cached reads (i.e., reads from hardware components and un-cacheable memory), along with a time during execution at which each piece of data was brought into the cache(s) 102b (e.g., using a count of instructions executed or some other counter). The effect is to therefore record a log of all the data that was consumed by a traced processing unit 102a during code execution. However, due to alternate execution of plural threads and/or speculative execution, this implementation could record more data than is strictly necessary to replay execution of the traced code.

A second implementation in the second family of approaches improves on the first implementation by tracking and recording only the cache lines that were "consumed" by each processing unit 102a, and/or tracking and recording only subset(s) of cache lines that are being used by processing units 102a that are participating in tracing—rather than recording all the cache misses. As used herein, a processing unit has "consumed" a cache line when it is aware of the cache line's present value. This could be because the processing unit is the one that wrote the present value of the cache line, or because the processing unit performed a read on the cache line. Some embodiments track consumed cache lines with extensions to one or more of the cache(s) 102b (e.g., additional "logging" or "accounting" bits) that enable the processor 102 to identify, for each cache line, one or more processing units 102a that consumed the cache line. Embodiments can track subset(s) of cache lines that are being used by processing units 102a that are participating in tracing through use of way-locking in associative caches—for example, the processor 102 can devote a subset of ways in each address group of an associative cache to tracked processing units, and log only cache misses relating to those ways.

A third implementation in the second family of approaches could additionally, or alternatively, be built on top a cache coherence protocol (CCP) used by the cache(s) 102b. In particular, the third implementation could us the CCP to determine a subset of the "consumed" cache lines to record into the trace data store 104e, and which will still enable activity of the cache(s) 102b to be reproduced. This approach could operate at a single cache level (e.g., L1) and log influxes of data to that cache level, along with a log of CCP operations at the granularity of the processing unit that caused a given CCP operation. This includes logging which processing unit(s) previously had read and/or write access to a cache line.

A fourth implementation could also utilize CCP data, but operate at two or more cache levels—logging influxes of data to an "upper-level" shared cache (e.g., at an L2 cache), while, using a CCP of at least one "lower-level" cache (e.g., a CCP one more L1 caches) to log a subset of CCP state transitions for each cached memory location (i.e., between sections of "load" operations and sections of "store" operations). The effect is to log less CCP data than the third implementation (i.e., since it records far less CCP state data than the third implementation, since it records based on load/store transitions rather than per-processing unit activity). Such logs could be post-processed and augmented to reach the level of detail recorded in the third implementation, but may potentially be built into silicon using less costly hardware modifications than the third implementation (e.g., because less CCP data needs to be tracked and recorded by the processor 102).

Regardless of the recording approach used by the tracer 104a, it can record the trace data into the one or more trace data stores 104e. As examples, a trace data store 104e may include one or more trace files, one or more areas of physical memory, one or more areas of a processor cache (e.g., L2 or L3 cache), or any combination or multiple thereof. A trace data store 104e could include one or more trace data streams. In some embodiments, for example, multiple entities (e.g., processes, threads, etc.), could each be traced to a separate trace file or a trace data stream within a given trace file. Alternatively, data packets corresponding to each entity could be tagged such that they are identified as corresponding to that entity. If multiple related entities are being traced (e.g., plural threads of the same process), the trace data for each entity could be traced independently (enabling them to be replayed independently), though any events that are orderable across the entities (e.g., access to shared memory) can be identified with a sequencing number (e.g., a monotonically incrementing number) that is global across the independent traces. The trace data store 104e can be configured for flexible management, modification, and/or creation of trace data streams. For example, modification of an existing trace data stream could involve modification of an existing trace file, replacement of sections of trace data within an existing file, and/or creation of a new trace file that includes the modifications.

In some implementations, the tracer 104a can continually append to trace data stream(s) such that trace data continually grows during tracing. In other implementations, however, the trace data streams could be implemented as one or more ring buffers. In such implementation, the oldest trace data is removed from the data stream(s) as new trace data is added to the trace data store 104e. As such, when the trace data streams are implemented as buffer(s), they contain a rolling trace of the most recent execution at the traced process(es). Use of ring buffers may enable the tracer 104a to engage in "always on" tracing, even in production systems. In some implementations, tracing can be enabled and disabled at practically any time. As such, whether tracing to a ring buffer or appending to a traditional trace data stream, the trace data could include gaps between periods during which tracing is enabled.

The trace data store 104e can include information that helps facilitate efficient trace replay and searching over the trace data. For example, trace data can include periodic key frames that enable replay of a trace data stream to be commenced from the point of the key frame. Key frames can include, for example, the values of all processor registers 102d needed to resume replay. Trace data could also include memory snapshots (e.g., the values of one or more memory addresses at a given time) reverse lookup data structures (e.g., identifying information in the trace data based on memory addresses as keys), and the like.

Even when using the efficient tracing mechanisms described above, there may be practical limits to the richness of information that can be stored into the trace data store 104e during tracing by the tracer 104a. This may be due to an effort to reduce memory usage, processor usage, and/or input/output bandwidth usage during tracing (i.e., to reduce the impact of tracing on the application(s) being traced), and/or to reduce the amount of trace data generated (i.e., reducing the disk space usage). As such, even though a trace data can include rich information, such as key frames, memory snapshots, and/or reverse lookup data structures, the tracer 104a may limit how frequently this information is recorded to the trace data store 104e, or even omit some of these types of information altogether.

To overcome these limitations, embodiments can include the indexer 104b, which takes the trace data generated by the tracer 104a as input, and performs transformation(s) to this trace data to improve the performance of consumption of the trace data (or derivatives thereof) by the debugger 104c. For example, the indexer 104b could add key frames, memory snapshots, reverse lookup data structures, etc. The indexer 104b could augment the existing trace data, and/or could generate new trace data containing the new information. The indexer 104b can operate based on a static analysis of the trace data, and/or can perform a runtime analysis (e.g., based on replaying one or more portions of the trace data).

The debugger 104c is usable to consume (e.g., replay) the trace data generated by the tracer 104a into the trace data store 104e, including any derivatives of the trace data that were generated by the indexer 104b (executing at the same, or another, computer system), in order to assist a user in performing debugging actions on the trace data (or derivatives thereof). For example, the debugger 104c could present one or more debugging interfaces (e.g., user interfaces and/or application programming interfaces), replay prior execution of one or more portions of the application 104g, set breakpoints/watchpoints including reverse breakpoints/watchpoints, enable queries/searches over the trace data, etc.

The security component 104d identifies sensitive information (i.e., data and/or code) that is captured by the tracer 104a and takes one or more actions to ensure that such information is restricted from being presented at the debugger 104c. With respect to sensitive data, this could include one or more of preventing the sensitive data from being placed in the trace data store 104e, removing the sensitive data from the trace data store 104e, masking/encrypting the sensitive data in the trace data store 104e, compartmentalizing the sensitive data the trace data store 104e (e.g., by storing it into a separate trace data stream), modifying trace data so that execution during replay of the trace data is modified to avoid presenting the sensitive data, modifying trace data so that an execution path taken during replay of the trace data is the same as a path taken during tracing—even though the modified trace data lacks the sensitive data, preventing the debugger 104c from presenting sensitive data even though it exists in the unmodified trace data, etc. With respect to sensitive code, this could include removing the code from the trace data, bypassing the code in the trace data 104e, encrypting the code in the trace data 104e, etc. Example embodiments of the security component 104d are described in more detail in connection with FIG. 2.

In some implementations, the security component 104d augments functionality of one or more of the tracer 104a, the indexer 104b, the debugger 104c. Thus, for example, the security component 104d could augment the tracer 104a with the ability to avoid writing sensitive information to the trace data store 104e, and/or to protect the sensitive information in the trace data store 104e; the security component 104d could augment the indexer 102b with the ability to scrub trace data of sensitive information, and/or mask sensitive information in trace data; and/or the security component 104d could augment the debugger 104c with the ability to avoid presenting sensitive information contained in trace data.

While the tracer 104a, the indexer 104b, the debugger 104c, and the security component 104d are depicted (for clarity) as separate entities, it will be appreciated that one or more of these entities could be combined (e.g., as sub-components) into a single entity. For example, a debugging suite could comprise each of the tracer 104a, the indexer 104b, the debugger 104c, and the security component 104d. In another example, a tracing suite could include the tracer 104a and the indexer 104b, and a debugging suite could comprise the debugger 104c; alternatively, the tracing suite could include the tracer 104a, and the debugging suite could comprise the indexer 104b and the debugger 104c. In these latter examples, the security component 104d could be embodied in each of the tracing suite and the debugging suite or could be embodied as a common library shared by these suites. Other variations are of course possible. Notably, the tracer 104a, the indexer 104b, the debugger 104c, and the security component 104d need not all exist at the same computer system. For example, a tracing suite could be executed at one or more first computer systems (e.g., a production environment, a testing environment, etc.), while a debugging suite could be executed at one or more second computer systems (e.g., a developer's computer, a distributed computing system that facilitates distributed replay of trace data, etc.). Also, as depicted, the tracer 104a, the indexer 104b, and/or the debugger 104c may access the trace data store 104e directly (i.e., as indicated by the broken arrows) and/or through the security component 104c (i.e., as indicated by the solid arrows).

Figure 2:
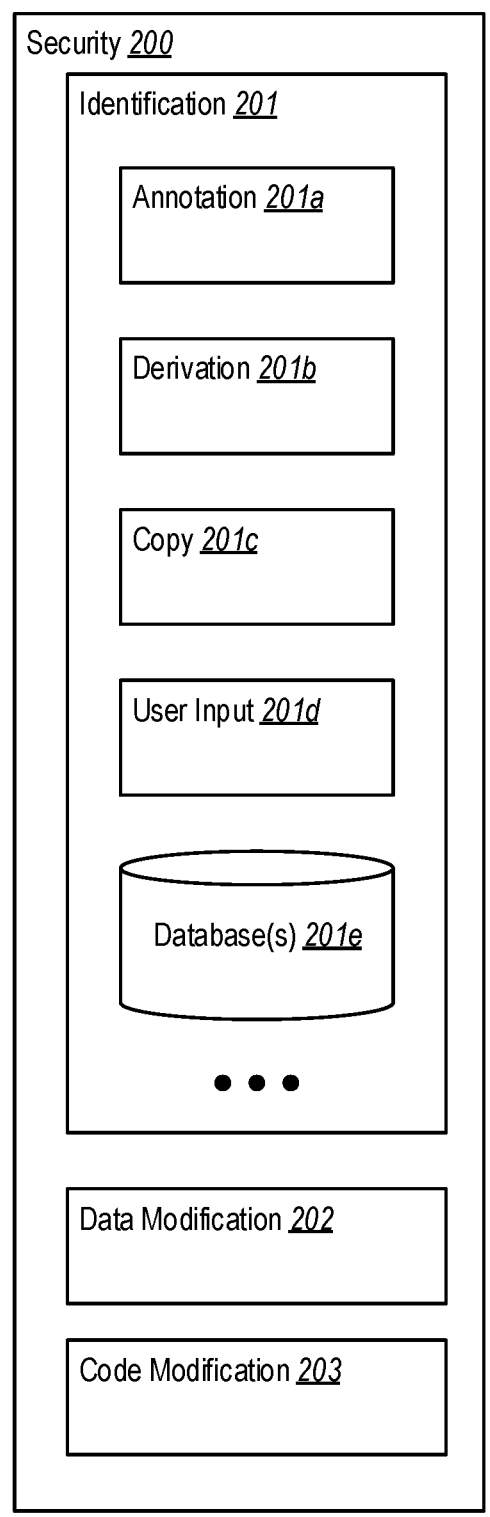
FIG. 2 illustrates example embodiments of a security component.

As mentioned, FIG. 2 illustrates example embodiments of a security component 200, such as security component 104d of FIG. 1. As shown, the security component 200 can include a plurality of sub-components such as, for example, an identification component 201 (including an annotation sub-component 201a, a derivation sub-component 201b, a copy sub-component 201c, a user input sub-component 201d, database(s) 201e, etc.), a data modification component 202, a code modification component 203, etc. While these components are presented as an aide in describing functionality of the security component 200, it will be appreciated that the particular number and identity of these component can vary, depending on implementation.

The identification component 201 identifies original information that is sensitive. As mentioned, this could include both information that is potentially sensitive and information that is definitively sensitive. Original information could correspond to any form of code or data accessed by a processor 102, and which is typically stored at one or more memory addresses. Original information could correspond to at least a portion of one or more of a pointer, a data structure, a variable, a class, a field, a function, a source file, a component, a module, an executable instruction, etc.

The particular time at which the identification component 201 identifies sensitive information could vary, depending on implementation. For example, identification could occur during initial recording into the trace data store 104e by the tracer 104a (e.g., a runtime analysis, such as using page table entries, enclave region metadata, etc.), during post-processing of trace data by the indexer 104b (e.g., a static analysis, potentially using debugging symbols and the like), and/or during replay (e.g., a static and/or runtime analysis) of trace data by the indexer 104b and/or the debugger 104c. When its identifies sensitive information, the identification component 201 could record it in one or more database(s) 201e, for use by the copy component 102c, as described later.

The identification component 201 could identify sensitive information in a variety of ways, as expressed through the annotation sub-component 201a, the derivation sub-component 201b, the copy sub-component 201c, and the user input sub-component 201d (though additional methods are possible, as indicated by the ellipses). The annotation sub-component 201a, the derivation sub-component 201b, and the copy sub-component 201c will now described in detail. However, it is initially noted that the user input sub-component 201d can be utilized in connection with any of these components, such as to manually identify code that interacts with sensitive data (i.e. as input to the annotation sub-component 201a), to manually identify data derived data (i.e. as input to the derivation sub-component 201b), to manually identify copies of data (i.e. as input to the copy sub-component 201c) and/or to provide data for the database(s) 201e.

In general, the annotation sub-component 201a could identify sensitive information based on annotations about an entity that is executing at the processor(s) 102, and that is being traced. For example, the entity's code (whether that be source code, object code, assembly code, machine code, etc.) could be annotated to identify one or more portions of the code that are themselves sensitive, that take sensitive data as input, that processes sensitive data, that generate sensitive data, that store sensitive data, etc. For instance, an entity could be annotated to identify functions, parameters, modules, variables, data structures, source code files, input fields, etc. that are themselves sensitive, and/or that could potentially involve the creation, consumption, or processing of sensitive data. As examples, the memory region of a secure enclave may be considered sensitive (for code, data read, and/or data write). As examples, the page table entries applicable during the original execution may indicate permissions that applied to portions (or all) of a trace stream. As examples, a PCID, ASID, processor security level, processor exception level, or similar may be used to determine security boundaries that apply to portions (or all) of a trace stream. Thus, the annotation sub-component 201a can use these annotations to identify when sensitive code portions execute (e.g., as part of tracing that code, replaying in that code, and/or analyzing that code based on its prior execution being traced into the trace data store 104e), and/or when executing code portions access, process, and/or generate sensitive data.

The annotations relied upon by the annotation sub-component 201a could be added to an entity's code itself, could be added as separate metadata files, and/or could even be stored in the database(s) 201e. These annotations could be created in variety of manners, such as using manual, automated, and/or semi-automated techniques—such as one or more of human input (i.e., using the user input component 201d), machine learning, derivation analysis by the derivation sub-component 201b, etc. Annotations about an entity could be created prior to analysis by the annotation sub-component 201a and/or during analysis by the annotation sub-component 201a (e.g., based on user input, machine learning, derivation analysis, etc.).

The derivation sub-component 201b, on the other hand, leverages the rich nature of time-travel traces (i.e., the fact that they capture a bit-accurate trace of how code executed previously) to track code execution, including the flow of data during code execution—in one or both of the forward and reverse directions on an execution timeline. As part of this tracking, the derivation sub-component 201b could identify at least one or more of (i) data that is derived from data already identified as sensitive; (ii) data from which data that is already identified as sensitive was itself derived; (iii) code that could be annotated as relating to sensitive data, because it acts on data that was previously acted on by code known to relate to data identified as sensitive; (iv) code that could be annotated as relating to sensitive data, because it acts on data that later acted on by code known to relate to data identified as sensitive; or (v) code that could be annotated as being sensitive, itself, because it has an execution continuity with code already identified as sensitive. In order to further understand these concepts FIGS. 3A and 3B illustrate an examples of derivation analysis used to identify derived data and/or code.

Figure 3A:
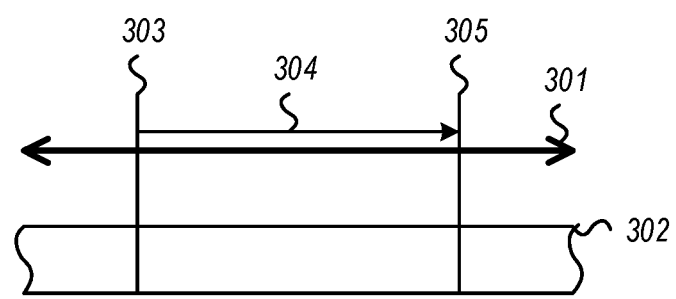
FIG. 3A illustrates an example of identifying derived data and/or code in a forward direction on an execution timeline, in reliance on a bit-accurate trace.
Figure 3B:
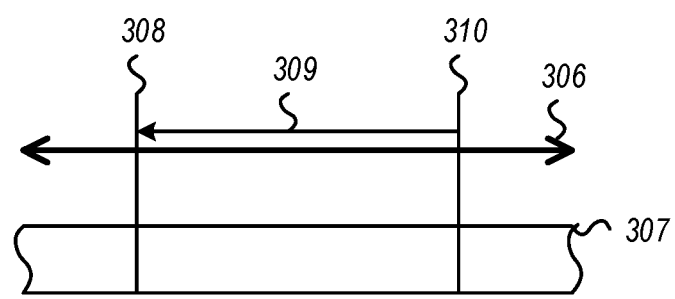
FIG. 3B illustrates an example of identifying derived data and/or code in a reverse direction on an execution timeline, in reliance on a bit-accurate trace.

FIG. 3A illustrates an example 300a of identifying derived data and/or code in a forward direction on an execution timeline, in reliance on a bit-accurate trace. Example 300a includes a portion of a timeline 301 representing execution at a processing unit 102a, and a corresponding portion of a trace data stream 302 that stores a bit-accurate trace of that execution. Example 300a could represent tracing an original execution of an entity into the trace data stream 302, or a replay of the original execution of the entity from the trace data stream 302. FIG. 3A shows two points 303 and 305, both representing a different moment of execution during the timeline 301, and a corresponding portion of data in the trace data stream 302. In particular, point 303 represents a moment at which first data that is being accessed by first code has been identified as sensitive (and, by extension, that that the first code acts on sensitive data) and/or that it is known the first code is, itself, identified as sensitive. Point 305, on the other hand, represents a moment—later in execution—at which second data is being accessed by second code and/or the second code, itself, is being accessed or executed.

At point 305, is not yet known if the second data is sensitive; if the second code acts on sensitive data; and/or if the second code is, itself, sensitive. However, FIG. 3A also shows an arrow 304 from point 303 to point 305. Arrow 304 represents that there is a traced code and/or data continuity between points 303 and 305, which is usable to determine that the second data accessed at point 305 could also be identified as sensitive due to it being derived from the first data accessed at point 303 and/or that the second code that was accessed/executed at point 305 could, itself, be sensitive due to its relation to the first code that executed at point 303. Thus, the continuity represented by arrow 304 enables the derivation sub-component 201b to analyze/replay the trace data stream 302 in the forward direction (i.e., from point 303 to point 305), and to determine that the second data accessed at point 305 was derived from the first data accessed at point 303 and/or that the second code executed as a result of the first code.

Based on this continuity, the derivation sub-component 201b could then identify the second data as being sensitive; that the second code acts on sensitive data; and/or that the second code is, itself, sensitive. If the second code is identified as acting on sensitive data and/or being sensitive, itself, the annotation sub-component 201a could annotate the second code accordingly (if desired). While only one instance of derived data and/or code is depicted in FIG. 3A, it will be appreciated that this analysis could be applied recursively to identify any number of additional derived items.

FIG. 3B, on the other hand, illustrates an example 300b of identifying derived data and/or code in a reverse direction on an execution timeline, in reliance on a bit-accurate trace. Similar to FIG. 3A, FIG. 3B illustrates a portion of a timeline 306 representing execution at a processing unit 102a, and a corresponding portion of a trace data stream 307 that stores a bit-accurate trace of that execution. FIG. 3B also includes two points 308 and 310, both representing a different moment of execution during the timeline 306, and a corresponding portion of data into the trace data stream 307. Unlike FIG. 3A, however, FIG. 3B shows an arrow 309 that is in the reverse direction—i.e., from point 310 to point 308—representing a traced code/data continuity between these points. This means that point 310 is a point at which the data accessed is identified as sensitive and/or that the code executed is identified as sensitive; and that point 308 is a point at which related data and/or code is being accessed (i.e., at a prior time during the execution timeline 306). Here, the continuity represented by arrow 309 enables the derivation sub-component 201b to determine in the reverse direction (i.e., from point 310 to point 308) that the data accessed at point 310 was derived from the data accessed at point 308 and/or that the code executed at appoint 310 is related to the code executed at point 308. Thus, the derivation sub-component 201b could identify the data accessed at point 308 as being sensitive; that the code executed at point 308 interacts with sensitive data; and/or that the code executed at point 308 is, itself, sensitive. Again, the annotation sub-component 201a could annotate this code as needed and/or this analysis could be applied recursively (either forwards from point 310 and/or backwards from point 308) to identify any number of additional derived items. In implementations, this allows identification of (and thus protection of) sensitive data backwards in execution time.

The copy sub-component 201c identifies copies of sensitive information based on the database(s) 201e, which identify, or include, information that has previously been identified as sensitive. The copy sub-component 201c can make these identifications at runtime (e.g., as part of tracing using the tracer 104a, and/or as part of replay using the indexer 104b and/or the debugger 104c), or statically (e.g., as part of a static analysis of trace data, such as by the indexer 104b). In general, the copy sub-component 201c can determine if items accessed, generated, and/or executed at runtime (whether that be during tracing or during replay), and/or that are logged into the trace data store 104e, could be identified as sensitive based on comparing them directly to entries in the database(s) 201e, and/or comparing some derivative of them to the entries in the database(s) 201e.

As alluded to, the database(s) 201e could be generated by the identification component 201, and/or can be otherwise provided to the identification component 201 (e.g., by a human user). For example, when it identifies an item as being sensitive (e.g., based on operation of the annotation component 201a, operation of the derivation component 201b, or user input at the user input component 201d), the identification component 201 could store that item itself, or a derivative thereof, in some form of searchable data store(s)—such as lookup table(s), hash table(s), SQL data table(s), etc. As such, as it operates the identification component 201 can develop an evolving knowledgebase of identified sensitive information upon which the copy sub-component 201c can rely. In some implementations, data type information (e.g., from debugging symbols, function prototype information, etc.) may augment the identification of data, such as by identifying how sensitive data could be embodied within structures, strings, or other data types. As mentioned, the database(s) 201e could store the information itself, or a derivative thereof. Storing a derivative of the information (e.g., a hash of the information, an encrypted version of the information, etc.) could provide several benefits, such as maintaining security of the information, reducing storage requirements in the database(s) 201e, and/or improving the storage and/or search performance of the database(s) 201e.

When the copy sub-component 201c is tasked with determining if original information is sensitive or not, it can compare that original information to the entries in database(s) 201e to determine if it has previously been identified in database(s) 201e as sensitive. If so, the copy sub-component 201c could also identify this instance of the information as sensitive. If the database(s) 201e store hashed or encrypted versions of the sensitive information, the copy sub-component 201c may hash or encrypt the original information with the same algorithm(s)/keys prior to the comparison.

By maintaining and using searchable database(s) 201e in this manner, the identification component 201 (utilizing the copy sub-component 201c) can help identify sensitive information in several situations that may not normally be recognized by the annotation sub-component 201a and/or the derivation sub-component 201b. The reason is that, even though an item may be identifiable by the annotation sub-component 201a and/or the derivation sub-component 201b as sensitive at a first moment during code execution (e.g., because it was used in connection with code already known to interact with sensitive data), that same information may not be otherwise identifiable to these components as sensitive at a second moment during code execution—whether that second moment be prior to, or subsequent to, the first moment. Thus, in at least some implementations, an earlier-in-time access to data in a bit-accurate trace can be determined as sensitive based on a subsequent (later in execution time) access to that data causing the data to be identified as sensitive. In at least some situations, this allows protection of information even at a first usage, even when that first usage would not itself result in identification of the data as sensitive, and prior to (in execution time) any access that would result in identification of the data as sensitive.

For example, even though a data item or code may actually be related by code continuity to sensitive information already identified in the database(s) 201e, that code continuity may not be captured in the trace data store 104e. This can happen, for example, in situations in which the trace data store 104e lacks trace data for one or more periods of execution time. The trace data store 104e could lack such data if tracing is enabled and disabled while recording, and/or if trace data stream(s) are implemented as ring buffer(s).

In the case of tracing being enabled/disabled while recording, sensitive data could be read by first code while tracing is enabled, tracing could then be disabled, and the same data could be read again by second (but related) code when tracing is subsequently enabled. In this situation, the sensitive data might be identified in connection with the first read, based on the annotation sub-component 201a knowing that the first code interacts with sensitive data; however, the annotation sub-component 201a may be unable to identify the same data as sensitive during the subsequent tracing period because the annotation sub-component 201a lacks knowledge that the second code interacts with sensitive data. Furthermore, the derivation sub-component 201b may be unable to trace continuity between the first and second reads due to a gap in available trace data. However, the copy sub-component 201c could recognize that data already known to be sensitive is being read by the second code, and therefore identify this second read as sensitive. This principle applies in the other direction as well—i.e., the first read could be identified by the copy sub-component 201c as sensitive based on the second read being identified as sensitive by the annotation sub-component 201a and/or the derivation sub-component 201b.

In the case of use of data stream(s) that are implemented as ring buffer(s), the trace data store 104e could store one or more memory snapshot(s) that are taken when tracing is active, but that contain values that were written to memory at a time when trace data is not available (e.g., because tracing was disabled, or the trace data has been evicted from a ring buffer). In these situations, the memory snapshot(s) could contain sensitive data, but this data not identifiable as sensitive by the annotation sub-component 201 and/or the derivation sub-component 201b because it is not known what code placed those values into memory (and whether there is continuity between that code and code known to interact with sensitive data). Here, the copy sub-component 201c could compare these values to the database(s) 201e to determine if any should be identified as sensitive data. Again, this principle applies in the other direction as well—i.e., the copy sub-component 201c could identify sensitive data in memory snapshots taken subsequent to periods of traced execution.

The copy sub-component 201c can also identify one or more copies of sensitive information even in situations in which the copies are entirely unrelated by code continuity to known sensitive information. For example, the same data could be provided as input to (or even be generated by) entirely separate and unrelated code execution paths. If this data is identified in one of the code execution paths as being sensitive, the copy sub-component 201c could also identify it as sensitive when it is used by the other code execution path. This principle also applies to the memory snapshot example above—i.e. even though data in a snapshot may be entirely unrelated to data that is identified as sensitive during code execution, it could nonetheless also be identified by the copy sub-component 201c as sensitive.

It will be appreciated that the copy sub-component 201c could process up to the entirety of the trace data in the trace data store 104e to locate all information in the trace data that is identified as sensitive in the database(s) 201e. Thus, once at least one copy of an item is identified as sensitive, the copy sub-component 201c can identify all other instances of the item in the trace data store 104e, regardless of how those instances made it into the trace data store 104e. This enables the security component 200 to remove/mask all instances of sensitive information from the trace data store 104e once it is identified. Similarly, if reverse-index structures exist in the trace data store 104e, once a memory location is identified as containing sensitive data, those reverse-index structures may be used to quickly identify other accesses to the sensitive data, and/or to identify when (in execution time) the sensitive data is overwritten with non-sensitive data.

Non-sensitive data can include data that is explicitly defined as not sensitive, or that is otherwise discovered to be non-sensitive (e.g., because it is discovered to be derived from, or a copy of, data that has been explicitly defined as not sensitive). It is possible that the identity of particular information could transition from sensitive to non-sensitive, and vice versa. For example, in implementations, sensitive data is considered sensitive until a type-specific condition is fulfilled. For example, a type-specific condition for a null-terminated string may be that all bytes of the original string length were overwritten with non-sensitive data, or that all bytes of the original string length were overwritten with zeros. Similarly, a structure (or higher-level construct such as a class) may have a type-specific condition that indicates the structure should continue to be considered sensitive until a destructor or other function is called, or a field/member has a particular value (in addition to, or as an alternative to, the default requirements).

In some embodiments, the identification component 201 includes functionality for handling code that moves or copies data, but that doesn't actually itself consume or processes the data that it moves/copies. Examples of such code could be the well-known memory copy (e.g., memcpy, memcpy_s, memmove, memmove_s, etc.) and string copy (e.g., strcpy, strncpy, etc.) family of functions used in the C programming language. Such functions could move or copy sections of memory that include sensitive information, but these functions don't actually do anything with the data apart from the move/copy (i.e., they are neutral with respect to sensitive data).

In some implementations, the derivation sub-component 201c and/or the copy sub-component 201c might cause such functions to be marked as relating to sensitive information, which could then—undesirably—cause all code touched by such functions to be identified as sensitive. To avoid this, embodiments could keep a list of well-known functions that are sensitive data neutral (e.g., in the database(s) 201e). This list could then be used to prevent these functions from being identified as relating to sensitive information. While this could cover well-known functions (such as memcpy and stringcpy) that are sensitive data neutral, it may not cover custom-coded functions that are sensitive data neutral. As such, additionally, or alternatively, embodiments could detect code that reads and/or writes data, but that does not make any decisions based on that data (i.e., it just moves/copies it around), and avoid identifying such code as involving sensitive information. Example implementations could have annotations in the binary code that indicate a function is (or is not) sensitive data neutral, annotations in debugging symbols, etc. Such detection could allow for exceptions that permit code to perform limited decision making on the data it moves/copies (e.g., such as performing a copy up to but not including a null terminator) while still being considered sensitive data neutral.

Based on the identification component 201 identifying information as being sensitive, the security component 200 uses one or both of the data modification component 202 or the code modification component 203 to remove it from, or mask it within, the trace data store 104e.

The data modification component 202 replaces data items that that have been identified as sensitive with alternative data and/or causes these data items to be stored in the trace data store 104e in a masked or protected manner. For example, FIGS. 4A and 4B illustrate example embodiments of data item replacement and/or masking in time-travel tracing.

Figure 4A:
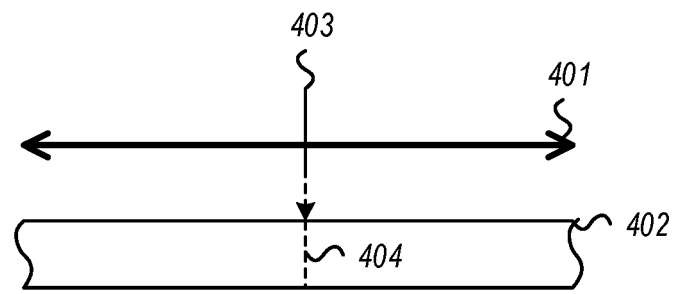
FIG. 4A illustrates an example of sensitive data item replacement/masking with respect to a single trace data stream.

Initially FIG. 4A illustrates an example 400a of sensitive data item replacement/masking with respect to a single trace data stream. In particular, FIG. 4A illustrates a portion of a timeline 401 representing execution of an entity at a processing unit 102a, and a corresponding portion of a trace data stream 402 that stores a bit-accurate trace of that execution. FIG. 4A also shows that a sensitive data item is identified at point 403 in execution, and that this sensitive data is replaced or masked at a corresponding point 404 in the trace data stream 402 by the data modification component 202. Replacing the data item can include identifying or generating alternative data to store in the trace data stream 402, rather than the original data identified at point 403. This can include the data modification component 202 generating random data, identifying predefined data, generating a derivative of the original data (e.g., a hash), etc. In some embodiments, identifying or generating alternative data can include preserving one or more characteristics of the original data, such as preserving a type of the data (e.g., string, integer, float, etc.), preserving a size of the data (e.g., integer size, string length, etc.), preserving portion of the data (e.g., replacing only a subset of a string), etc. Masking the data item could include the data modification component 202 encrypting the data item prior storing it in the trace data stream 402, encrypting an entire trace data stream 402 or trace file, etc.

Figure 4B:
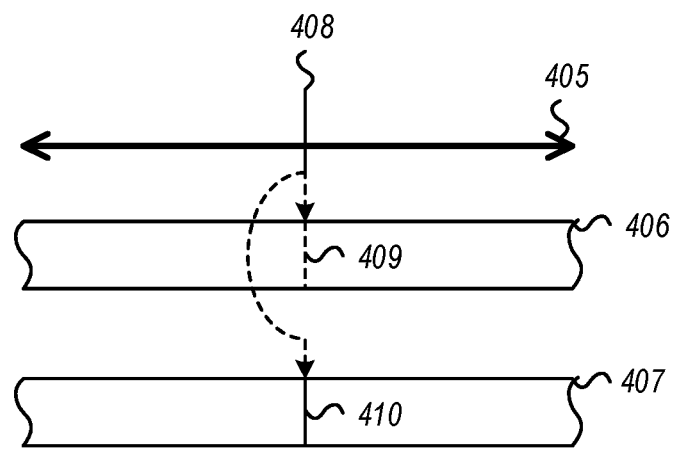
FIG. 4B illustrates an example of sensitive data item replacement/masking with respect to plural trace data streams.

FIG. 4B, on the other hand, illustrates an example 400b of sensitive data item replacement/masking with respect to plural trace data streams. In particular, FIG. 4B illustrates a portion of a timeline 405 representing execution of an entity at a processing unit 102a, and corresponding portions of trace data streams 406 and 407 that are used to store a bit-accurate trace of that execution. Similar to FIG. 4A, FIG. 4B shows that a sensitive data item is identified at point 408 in execution. However, rather than replacing or masking this data item in a single trace data stream, FIG. 4B shows that the data item is replaced in a first data stream (i.e., point 409 in trace data stream 406), while it is stored in an original or masked form in a second data stream (i.e., point 410 in trace data stream 407). Replacing the data item in trace data stream 406 can include any of the mechanisms for generating or identifying alternative data described above in connection with FIG. 4A; storing data item in a masked form can include any of the masking mechanisms described above in connection with FIG. 4A. The debugger 104c can then use data items from trace data stream 406 when sensitive data should be protected, and can use data items from trace data stream 407 when sensitive data need not be protected (e.g., depending on a user using the debugger 104c, a computer on which the debugger 104c is operating, whether a decryption key has been provided, etc.). Notably, trace data stream 407 need not be a full trace of execution timeline 405. For example, trace data stream 406 could be used to store a full trace, while trace data stream 407 could be used to store a subset of tracing activities, such as those relating to sensitive information.

The data modification component 202 can operate at any time during trace generation or consumption. For example, the data modification component 202 could operate when the timelines 401/405 represent an original execution of the entity, and when the trace data streams 402/406/407 are original trace data streams (e.g., as recorded by the tracer 104a). In another example, the data modification component 202 could operate when the timelines 401/405 represent a replayed execution of the entity (e.g., by the indexer 104b and/or debugger 104c), and when the trace data streams 402/406/407 are derived/indexed trace data streams. The data modification component 202 can also operate based on a static analysis of trace data, such as by the indexer 104b.

The code modification component 203 stores data into a trace that ensures that an execution path that was taken by an entity during its original execution will also be taken during replay, despite data replacement activity of the data modification component 202; and/or stores data into a trace that causes alternative executable instructions, rather than original executable instructions, to be executed during the replay of the entity. These concepts are described in connection with FIGS. 5A-5C.

Figure 5A:
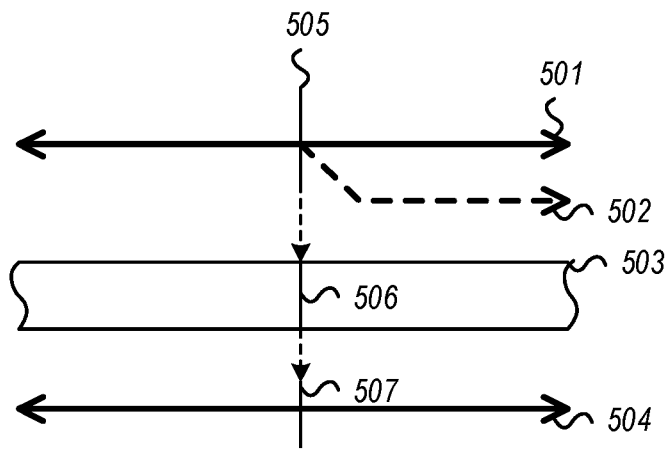
FIG. 5A illustrates an example of ensuring that an execution path that was taken by an entity during its original execution will also be taken during replay despite data replacement.

Initially, FIG. 5A illustrates an example 500a of ensuring that an execution path that was taken by an entity during its original execution will also be taken during replay, despite data replacement. In particular, FIG. 5A illustrates a portion of a timeline 501 representing execution of an entity at a processing unit 102a, and a corresponding portion of a trace data stream 503 that stores a bit-accurate trace of that execution. FIG. 5A also shows that a sensitive data item is identified at point 505 in execution—which could be replaced in the trace data stream 503 by the data modification component 202. However, FIG. 5A shows that, depending on the value of the sensitive data item, point 505 have caused an alternate execution path 502 to occur. For example, the sensitive data item could have been a parameter of a conditional statement in code. As such, replacing of the sensitive data item by the data modification component 202 could cause this alternate execution path 502 to occur at replay—which would result in incorrect trace replay. In order to prevent this replay behavior, the code modification component 203 can store at point 506 in the trace data stream 503 trace data that ensures the original execution path also be taken during replay, despite the data replacement. This is indicated by replay timeline 504, which shows the original execution path being taken.

In some embodiments, the code modification component 203 records trace data that comprises one or more alternate executable instructions that will take the original path, despite the data replacement. For example, original instructions could be replaced with alternate executable instruction that alter the condition. Additionally, or alternatively, the code modification component 203 could record trace data that comprises code annotations that cause the original execution path to be taken, despite the result execution a conditional instruction during replay. For example, as mentioned, some tracing embodiments record the side-effects of non-deterministic instructions, so that these instructions can be replayed later. Embodiments could apply the same principle to deterministic conditional instructions—i.e., the desired outcome of conditional instruction could be recorded as a "side effect," and this side effect could then be used to cause the desired outcome at replay despite the actual result of executing the conditional instruction.

At times, the security component 200 could avoid use of the code modification component 203, while still ensuring that the correct execution path is taken in spite of a data modification. For example, the data modification component 202 could ensure that alternate data it replaces original data with will result in the same outcome of a condition. This could be accomplished, for example, by ensuring that alternate data has the same size (e.g., string length) as the original data, if the outcome of the condition is based on data size.

Figure 5B:
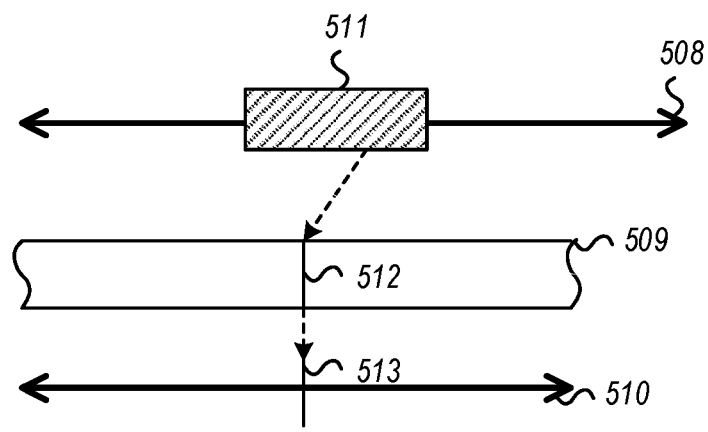
FIG. 5B illustrates an example of storing data into single trace data streams that causes alternative executable instructions to be executed during the replay of an entity.

FIG. 5B illustrates an example 500b of storing data into single trace data stream that causes alternative executable instructions to be executed during the replay of an entity. In particular, FIG. 5B illustrates a portion of a timeline 508 representing execution of an entity at a processing unit 102a, and a corresponding portion of a trace data stream 509 that stores a bit-accurate trace of that execution. FIG. 5B also shows at section 511 that execution of sensitive code is identified. As a result of identification of section 511 of sensitive code, the code modification component 203 could record into trace data stream 509 data at point 512 that effectively bypass section 511 during replay, but that enable the replay to continue as normal—less executing the sensitive code—as indicated by point 513 on replay timeline 510. For example, the data at point 512 could include one or more alternative instructions that replace a call to the sensitive code with one or more instructions that establish state (e.g., register and memory values) that would have resulted from execution of section 511, and that jump to an instruction executed immediately after section 511. As part of this, the code modification component 203 could leverage the data modification component 202 to replace any sensitive data in that state, as necessary. Additionally, or alternatively, the data at point 512 could include one or more key frames, such as a key frame that causes replay to skip the section 511. Additionally, or alternatively, the data at point 512 could include one or more "side effects," such as a side effect that causes an existing instruction to bypass a call to the section 511. Regardless of how it does it, the data stored at point 512 causes the section 511 of sensitive code to be effectively converted into a "black box" during replay. The technical effect is, therefore, that timeline 508 can be replayed while skipping or bypassing section 511. In some embodiments, the code modification component 203 could capture a memory snapshot and/or a key frame at the beginning and/or end of the section 511, in order to capture memory and/or register state and record these snapshot(s) and/or key frame(s) in the trace data stream 509.

Figure 5C:
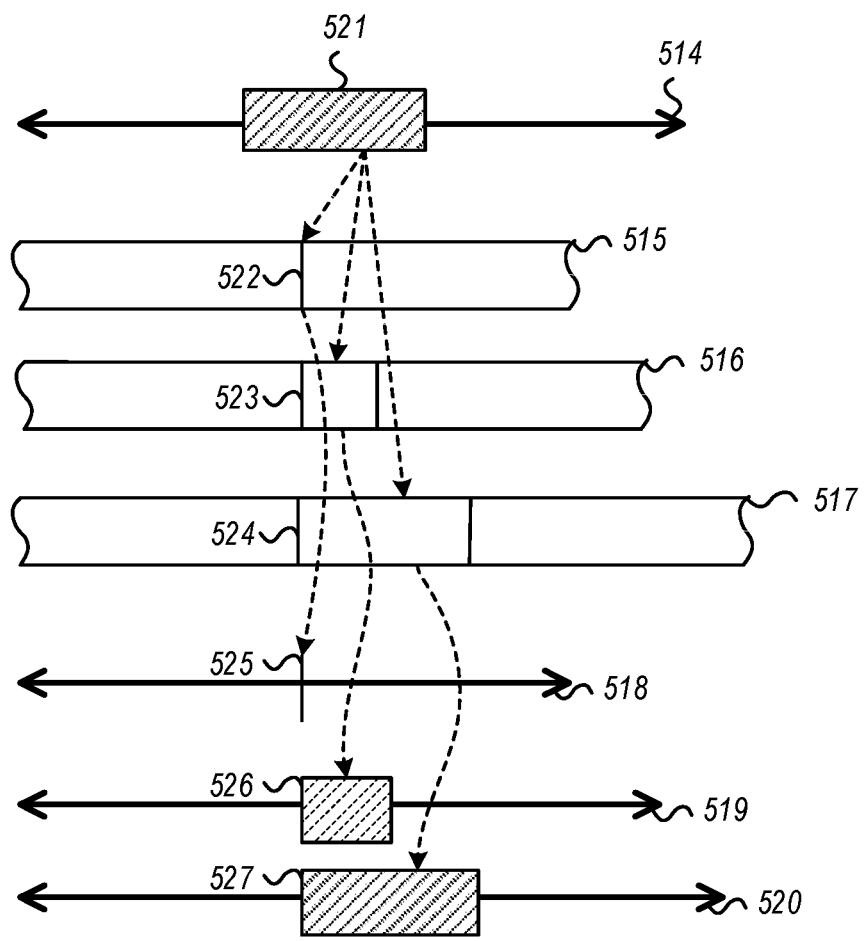
FIG. 5C illustrates an example of storing data into at least one trace data stream that cause alternative executable instructions to be executed during the replay of an entity.

FIG. 5C illustrates an example 500c of storing data into at least one trace data stream that cause alternative executable instructions to be executed during the replay of an entity. In particular, FIG. 5C illustrates a portion of a timeline 514 representing execution of an entity at a processing unit 102a, and corresponding portions of trace data streams 515, 516, and/or 517 that could be used to store a bit-accurate trace of that execution. FIG. 5C also shows that section 521 is identified as execution of sensitive code (or access to sensitive data). In implementation, as a result of identification of section 521 as sensitive, the code modification component 203 could record into trace data stream 515 data at point 522 that effectively bypass section 521 during replay, as described in connection with FIG. 5B. Thus, similar to trace data stream 509 of FIG. 5B, trace data stream 515 can be used to replay execution while bypassing the sensitive instructions in block 521—as indicated by point 525 on replay timeline 518.

Additionally, or alternatively, in implementations the code modification component 203 could record into trace data stream 516 instructions 523 that result in some (or all) of the side-effects that execution of section 521 would produce. As an example, the instructions 523 may write the final values to memory that execution of section 521 modified, and/or instructions 523 that ensure the register state matches that at the end of execution of section 521. As a concrete example, if section 521 corresponds to instructions that use a private key (sensitive data) to encrypt original data (sensitive data) into an encrypted form (non-sensitive data), the original sensitive data may be modified (as described throughout this specification), while the code in section 521 may be replaced with instructions 523 that write the final encrypted data. In this concrete example, this replacement may obviate any need for snapshot(s) or key frame(s) in the trace data stream 516, as the replacement instructions 523 recreate the side-effects of the removed section 519. Trace data stream 516 can then be used to replay the effects of executing the sensitive instructions in block 521, without actually executing the instructions in block 521—as indicated by block 526 on replay timeline 519.

Additionally, or alternatively, in implementations the code modification component 203 could record execution of block 521 into trace data stream 517, which could be encrypted. This is shown by block 524. Thus, trace data stream 517 could be used to actually replay execution of the sensitive code in block 521 (as indicated by block 527 on replay timeline 527), given the requisite permissions.

Any combination of trace data streams 515, 516, or 517 could be recorded and/or utilized for debugging. For example, when sensitive code should be protected at replay, the debugger 104c could replay the instruction(s) at point 522 in trace data stream 515, and/or could replay the instruction(s) at point 523 in trace data stream 516. When sensitive data does not be protected at replay (e.g., depending on a user using the debugger 104c, a computer on which the debugger 104c is operating, whether a decryption key has been provided, etc.), the debugger 104c could replay from block 527 in trace data stream 520. Notably, each trace data stream may not need not include a full trace of execution timeline 514. For example, trace data stream 515 could be used to store a full trace, while trace data stream(s) 516 and/or 517 could be used to store a subset of tracing activities, such as those relating to execution of sensitive code.

Like the data modification component 202, the code modification component 203 can operate at any time during trace generation or consumption, whether that be during tracing by the tracer 104a, indexing by the indexer 104b, and/or debugging by the debugger 104c. Additionally, the code modification component 203 can operate based on runtime analysis and/or static analysis.

Notably, the embodiments herein can encompass any combination and/or repetitive application of the examples shown in FIGS. 4A-5C.

Figure 6:
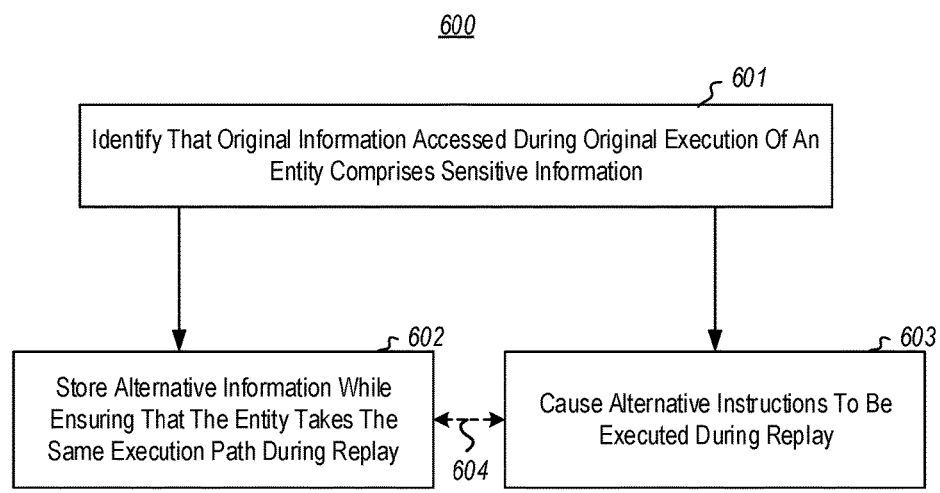
FIG. 6 illustrates a flow chart of an example method for protecting sensitive information in connection with tracing an original execution of an entity.

FIG. 6 illustrates a flow chart of an example method 600 for protecting sensitive information in connection with tracing an original execution of an entity. Method 600 will be described with respect to the components and data of computer architecture 100 of FIG. 1, the security component 200 of FIG. 2, and the examples of FIGS. 3-5C.

As shown, method 600 comprises an act of 601 of identifying that original information accessed during original execution of an entity comprises sensitive information. In some embodiments, act 601 includes identifying that original information, which was accessed based on an original execution of one or more original executable instructions of the entity, comprises sensitive information. For example, the identification component 201 could use one or more of the annotation sub-component 201a, the derivation sub-component 201b, the copy sub-component 201c, or the user input sub-component 201d to identify an item of sensitive information, either during original execution of an entity at one or more processing units 102a, or from the trace data store 104e. As explained throughout, the item of sensitive information could comprise sensitive data and/or sensitive code.

As shown, method 600 could also comprise an act of 602 of storing alternative information, while ensuring that the entity takes the same execution path during replay. In some embodiments, act 602 includes, based on the original information comprising the sensitive information, storing first trace data comprising alternative information, rather than the original information, into a first trace data stream, while ensuring that an execution path that was taken by the entity based on the original information will also be taken during replay of the original execution of the entity using the first trace data stream. For example, once sensitive data is identified by the identification component 201, the data modification component 202 can replace that data in the trace data store 104e with alternate data (such as in trace data streams 407 and 406 of FIGS. 4A and 4B), and could potentially also store the sensitive data in the trace data store 104e in a protected form (such as in trace data stream 407).

Ensuring that an execution path that was taken by the entity based on the original information will also be taken during replay of the original execution of the entity using the trace could be accomplished by one or both of the data modification component 202 or code modification component 203. For example, the data modification component 202 could choose alternate data that would result in a same result of a conditional evaluation as the original data. This might be accomplished, for example, by replacing a string with one that is of equal length if the condition is based on string length. The code modification component 203, on the other hand, could replace one or more original instructions with alternate instructions (e.g., the instructions at point 512 in trace data stream 509, or the instructions as point 522 in trace data stream 515) that bypass or alter the result of a condition, the code modification component 203 could annotate one or more instructions to override the result during replay, and/or the code modification component 203 could insert one or more key frames that simulate the result during replay.

As shown, method 600 could also comprise an act of 603 of causing alternative instructions to be executed during replay. In some embodiments, act 602 includes, based on the original information comprising the sensitive information, storing second trace data into a second trace data stream that causes one or more alternative executable instructions, rather than the one or more original executable instructions of the entity, to be executed during the replay of the original execution of the entity using the second trace data stream. For example, as explained in connection with trace data streams 509 and 515 of FIGS. 5B and 5C, the code modification component 203 could store trace data (e.g., at points 512 and 522) that causes code that was executed by the original entity to be bypassed during replay. This could include, for example, replacing a section of instructions with one or more instructions that bypass the block, storing one or more instructions replicate the side-effects of having executed the section, storing at least one memory snapshot in connection with the section, and/or storing at least one key frame in connection with the section.

Depending on the particular sensitive information identified in act 601, method 600 could include only one of acts 602 and 603, or it could include both of acts 602 and 603. As shown, if both of acts 602 and 603 are performed, they could potentially be performed in parallel, though they could also be performed serially. Additionally, as indicated by arrow 604, acts 602 and 603 could be performed in cooperation with one another. Additionally, any combination of acts 602 and 603 may be repetitively applied, each repetition being in any order, in parallel, or in cooperation with one another. Also, while acts 602 and 603 refer to first and second trace data streams, it will be appreciated that these could be the same trace data stream.

Notably, method 600 can be performed during activity of any of the tracer 104a, the indexer 104b, and/or the debugger 104c. As such, method 600 could performed during one or both of (i) the original execution of the entity, or (ii) a post-processing the trace after the original execution of the entity (either by the tracer 104b or the debugger 104c). Additionally, method 600 could be performed each time an item of original information that could potentially be sensitive is encountered in any of these phases. As such, method 600 could be repeated many times during trace recording, trace indexing, and/or trace debugging.

As mentioned, act 601 can include the identification component 201 using the derivation sub-component 201b and/or the copy sub-component 201c. If the derivation sub-component 201b is used, act 601 could comprise identifying that derived data resulting from the execution of one or more original executable instructions as also comprises sensitive information. If the copy sub-component 201c is used, act 601 could comprise identifying that a copy of the original information in the trace comprises sensitive information. In this case, the copy of the original information could exist in the trace at an execution time subsequent to a first existence of the original information in the trace (e.g., as described in connection with FIG. 3B), or at an execution time prior to a first existence of the original information in the trace (e.g., as described in connection with FIG. 3B). The copy of the original information and the original information could be related by a code continuity, or could be independent in the trace (e.g., separate user inputs). The copy of the original information could be used to identify that the original information is sensitive, or the original information could be used to identify that the copy of the original information is sensitive.

Accordingly, embodiments herein identify sensitive information in connection with a time-travel trace (during trace recording and/or at some later time) and remove and/or mask that sensitive information in the trace. As explained, embodiments may include storing alterative data in a trace (rather than original data identified as sensitive), replacing original instructions in the trace with alternative instructions that avoid executing sensitive code or that cause correct execution in view of a data replacement, overriding the execution behavior of one or more instructions, and the like. As such, embodiments enable time travel traces to be generated and consumed—even in production environments—while preserving sensitive information from being revealed.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for protecting sensitive information in connection with tracing an original execution of an entity, the method comprising:
    recording a replayable a trace of execution of an entity, including recording trace data that represents execution of a plurality of executable instructions of the entity;
    identifying that original information, which was accessed based on execution of one or more first executable instructions of the entity, comprises sensitive information;
    identifying derived information of the original information, the identifying being based on identifying execution of one or more second executable instructions of the entity that operate on the original information to create the derived information;
    based on the derived information being derived from the original information, determining that the derived information also comprises sensitive information; and
    based on the derived information comprising the sensitive information, performing one or more of:
        storing, into the trace, first trace data comprising alternative information, rather than the derived information, into a first trace data stream, while ensuring that an execution path that was taken by the entity based on the derived information will also be taken during replay of the entity using the first trace data stream; or
        storing, into the trace, second trace data into a second trace data stream that causes one or more alternative executable instructions, rather than the one or more second executable instructions of the entity, to be executed during the replay of the entity using the second trace data stream.

2. The method as recited in claim 1, wherein the method is performed during execution of the entity.

3. The method as recited in claim 1, wherein the method is performed during a post-processing the trace after execution of the entity.

4. The method as recited in claim 1, further comprising:
    identifying that a copy of the original information in the trace comprises sensitive information, the copy of the original information existing at an execution time prior to a first existence of the original information in the trace, and
    wherein identifying that the original information comprises sensitive information is based on the identifying that the copy of the original information in the trace comprises sensitive information.

5. The method as recited in claim 1, further comprising:
    identifying that a copy of the original information in the trace comprises sensitive information, the copy of the original information existing at an execution time later than a first existence of the original information in the trace, and
    wherein identifying that the original information comprises sensitive information is based on the identifying that the copy of the original information in the trace comprises sensitive information.

6. The method as recited in claim 1, further comprising:
    identifying that a copy of the original information in the trace comprises sensitive information, and
    wherein the copy of the original information and the original information are not related by a code continuity.

7. The method as recited in claim 1, wherein identifying that the original information comprises sensitive information is based on a determination that the original information is of a type selected from a list consisting of a specific data structure, a specific variable, a specific class, a specific field, a specific function, a specific source file, a specific component, a specific module, or an executable instruction.

8. The method as recited in claim 1, wherein the original information is identified as sensitive until a type-specific condition of a type associated with the original information has been met.

9. The method as recited in claim 1, wherein the method stores the first trace data comprising alternative information, rather than the derived information, into the first trace data stream, while ensuring that an execution path that was taken by the entity based on the derived information will also be taken during replay of the entity using the first trace data stream, and wherein ensuring that the execution path that was taken by the entity based on the derived information will also be taken during replay of the original execution of the entity using the trace comprises one or more of: recording side-effects of one or more instructions, recording one or more alternative instructions, or ensuring that the alternative information will result in a same result of a conditional evaluation as the derived information.

10. The method as recited in claim 1, wherein the method stores the second trace data into the trace that causes one or more alternative executable instructions to be executed during the replay of the original execution of the entity using the trace, and wherein storing the second trace data into the trace that causes one or more alternative executable instructions to be executed during the replay of the original execution of the entity using the trace comprises one or more of replacing a section of instructions with one or more instructions that bypass the section, replacing a section of instructions with one or more instructions that replicate side-effects of having executed the section of instructions, or storing at least one memory snapshot in connection with the section of instructions.

11. The method as recited in claim 1, wherein the method comprises storing both the first trace data and the second trace data, and wherein the first trace data stream and the second trace data stream are a same trace data stream.

12. A computer system, comprising:
    one or more processors; and
    one or more computer-readable media having stored thereon computer-executable instructions that, when executed by the one or more processors, cause the computer system to perform at least the following:

process a replayable a trace of execution of an entity, including processing trace data that represents execution of a plurality of executable instructions of the entity;

based on processing the replayable trace, identify that original information, which was accessed based on execution of one or more first executable instructions of the entity, comprises sensitive information;

identify derived information of the original information, the identifying being based on identifying execution of one or more second executable instructions of the entity that operate on the original information to create the derived information;

based on the derived information being derived from the original information, determine that the derived information also comprises sensitive information; and based on the original information comprising the sensitive information, perform one or more of:
storing, into the trace, first trace data comprising alternative information, rather than the derived information, into a first trace data stream, while ensuring that an execution path that was taken by the entity based on the derived information will also be taken during replay of the execution of the entity using the first trace data stream; or storing, into the trace, second trace data into a second trace data stream that causes one or more alternative executable instructions, rather than the one or more second executable instructions of the entity, to be executed during the replay of the execution of the entity using the second trace data stream.

13. The computer system as recited in claim 12, the computer-executable instructions also causing the computer system to identify that a copy of the original information in the trace comprises potentially sensitive information, the copy of the original information existing in the trace at an execution time prior to a first existence of the original information in the trace, wherein identifying that the copy of the original information comprises sensitive information is based on having identified that the original information comprises sensitive information.

14. The computer system as recited in claim 12, the computer-executable instructions also causing the computer system to identify that a copy of the original information in the trace comprises potentially sensitive information, the copy of the original information existing in the trace at an execution time subsequent to a first existence of the original information in the trace, wherein identifying that the copy of the original information comprises sensitive information is based on having identified that the original information comprises sensitive information.

15. The computer system as recited in claim 12, wherein ensuring that an execution path that was taken by the entity based on the original information will also be taken during replay of the execution of the entity using the trace comprises one or more of: recording side-effects of one or more instructions, recording one or more alternative instructions, or ensuring that the alternative information will result in a same result of a conditional evaluation as the original data.

16. The computer system as recited in claim 12, wherein storing second trace data into the trace that causes one or more alternative executable instructions to be executed during the replay of the execution of the entity using the trace comprises one or more of replacing a section of instructions with one or more instructions that bypass the section, replacing a section of instructions with one or more instructions replicate side-effects of having executed the section of instructions, or storing at least one memory snapshot in connection with the section of instructions.

17. A computer program product comprising one or more physical hardware storage devices having stored thereon computer-executable instructions that, when executed at a processor, cause a computer system to perform at least the following:

replay a replayable a trace of execution of an entity, including replaying trace data that represents execution of a plurality of executable instructions of the entity;

based on replaying the replayable trace, identify that original information, which was accessed based on execution of one or more first executable instructions of the entity, comprises sensitive information;

identify derived information of the original information, the identifying being based on identifying execution of one or more second executable instructions of the entity that operate on the original information to create the derived information;

based on the derived information being derived from the original information, determine that the derived information also comprises sensitive information; and based on the original information comprising the sensitive information, perform one or more of:
storing, into the trace, first trace data comprising alternative information, rather than the derived information, into a first trace data stream, while ensuring that an execution path that was taken by the entity based on the derived information will also be taken during subsequent replay of the execution of the entity using the first trace data stream; or storing, into the trace, second trace data into a second trace data stream that causes one or more alternative executable instructions, rather than the one or more second executable instructions of the entity, to be executed during subsequent replay of the execution of the entity using the second trace data stream.

* * * * *